United States Patent
Crall et al.

(10) Patent No.: US 7,757,275 B2
(45) Date of Patent: Jul. 13, 2010

(54) ONE TIME PASSWORD INTEGRATION WITH KERBEROS

(75) Inventors: Christopher J. Crall, Seattle, WA (US); Karthik Jaganathan, Redmond, WA (US); Liqiang Zhu, Kirkland, WA (US); Paul J. Leach, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1153 days.

(21) Appl. No.: 11/153,631

(22) Filed: Jun. 15, 2005

(65) Prior Publication Data
US 2006/0288230 A1 Dec. 21, 2006

(51) Int. Cl.
*G06F 21/00* (2006.01)
*H04L 29/06* (2006.01)

(52) U.S. Cl. .............. 726/5; 713/168; 713/183

(58) Field of Classification Search .............. None
See application file for complete search history.

(56) References Cited

U.S. PATENT DOCUMENTS

| | | | | |
|---|---|---|---|---|
| 6,003,136 | A * | 12/1999 | Schanze | 726/10 |
| 6,148,402 | A * | 11/2000 | Campbell | 726/10 |
| 6,148,404 | A * | 11/2000 | Yatsukawa | 726/2 |
| 6,460,141 | B1 * | 10/2002 | Olden | 726/4 |
| 7,089,584 | B1 * | 8/2006 | Sharma | 726/4 |
| 7,409,710 | B1 * | 8/2008 | Uchil et al. | 726/19 |
| 2004/0098614 | A1 * | 5/2004 | Chang et al. | 726/4 |
| 2005/0027713 | A1 * | 2/2005 | Cameron et al. | 707/100 |
| 2005/0149726 | A1 * | 7/2005 | Joshi et al. | 713/164 |
| 2005/0149759 | A1 * | 7/2005 | Vishwanath et al. | 726/4 |
| 2005/0288961 | A1 * | 12/2005 | Tabrizi | 705/1 |

OTHER PUBLICATIONS

Crawford, M., "Passwordless Initial Authentication to Kerberos by Hardware Preauthentication", Kerberos Working Group, http://www.watersprings.org/pub/id/draft-ietf-krb-wg-hw-auth-03.txt, Mar. 24, 2005, 6 pages.

* cited by examiner

*Primary Examiner*—Gilberto Barron, Jr.
*Assistant Examiner*—Abdulhakim Nobahar
(74) *Attorney, Agent, or Firm*—Woodcock Washburn LLP

(57) ABSTRACT

A domain controller (DC) side plugin supports one time passwords natively in Kerberos. Part of the key material is static and the other part is dynamic, thereby leveraging properties unique to each to securely support one time passwords in an operating system. The user is permitted to type in the one time passcode into a logon user interface. Rather than calling the SAM APIs to get the static passwords, vendors may register callbacks on the DC to plugin their algorithm. These callback functions will return the dynamically calculated passcodes for the user at a specific point in time. This passcode will then be treated as a normal password by the DC.

11 Claims, 4 Drawing Sheets

Kerberos Authentication Protocol

ONE TIME PASSWORD INTEGRATION WITH KERBEROS

BACKGROUND

Ever since the advent of digital computers, access control has been an important topic of computer security. To protect the integrity of computer systems and the confidentiality of important data, various access control schemes have been implemented to prevent unauthorized users and malicious attackers from gaining access to computer resources.

Authentication is the process of determining whether someone or something is, in fact, who or what it is declared to be. In private and public computer networks (including the Internet), authentication is commonly done through the use of usernames and passwords. Knowledge of a password is assumed to verify the user's identity. Each user registers initially, using an assigned or self-declared password. On each subsequent use, the user must know and use the previously declared password.

The use of traditional passwords has some weaknesses which allow it to be subject to brute force password guessing attacks. Many users do not choose or use complex passwords. Many companies have chosen to use one time password (OTP) devices to enhance security. However, these one time password devices are not integrated with operating systems.

Moreover, modification of clients may be used, usually accompanied by the storing of user passwords in a third party server which is not a very secure mechanism. Also, this requires the modifications of individual client applications.

Many institutions require a more stringent authentication process than the simple username and password approach.

An authentication protocol is a sequence of steps that is carried out in an authentication. When a client desires a connection to a server, authentication is required. An exemplary authentication protocol is Kerberos. According to the Kerberos protocol, authentication of the connection to the server is accomplished via a ticket. The ticket is initially received by the client from a ticket-issuing facility on the network known as a key distribution center (KDC). The ticket is re-useable for a period of time, whereby even if the session is terminated, the client does not have to repeat the authentication process while the ticket is still valid.

Thus, various schemes based on different protocols, such as the Kerberos protocol, have been proposed and implemented for controlling network access control by means of user authentication. Generally, the user logon for a computer and the user authentication for network access control are two separate procedures. Nevertheless, to minimize the burden on a user in dealing with the different access control schemes, the user logon and the user authentication for network access are sometimes performed together. For example, in the case where the user authentication is implemented under the Kerberos protocol, when the user logs on the computer, the computer may also initiate a Kerberos authentication process. In the authentication process, the computer contacts a Kerberos KDC to first obtain a ticket-granting ticket (TGT) for the user. The computer can then use the TGT to obtain from the KDC a session ticket for itself.

SUMMARY

The following summary provides an overview of various aspects of the invention. It is not intended to provide an exhaustive description of all of the important aspects of the invention, nor to define the scope of the invention. Rather, this summary is intended to serve as an introduction to the detailed description and figures that follow.

A domain controller (DC) side plugin supports one time passwords natively in Kerberos, for example, without any protocol changes. Part of the key material is static and the other part is dynamic, thereby leveraging properties unique to each to securely support one time passwords in an operating system.

DETAILED DESCRIPTION

The subject matter is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described.

An authentication protocol is a sequence of steps that are carried out in an authentication. Many authentication protocols have been designed to authenticate computing devices as well as applications, data, or other content.

While aspects of this invention will be described, for clarity, in an environment of discrete and remote computers, the invention can also be applied to authentication protocols in any environment, including application authentication, data authentication, user authentication, remote device authentication, process authentication, and the like. Several kinds of authentication protocols will be described herein for the purpose of introducing terms and concepts in authentication of computing processes, but this is not intended as a list of possible authentication protocols for use with the invention. It will be acknowledged that the invention can be used in conjunction with any authentication protocol.

Figure 1:
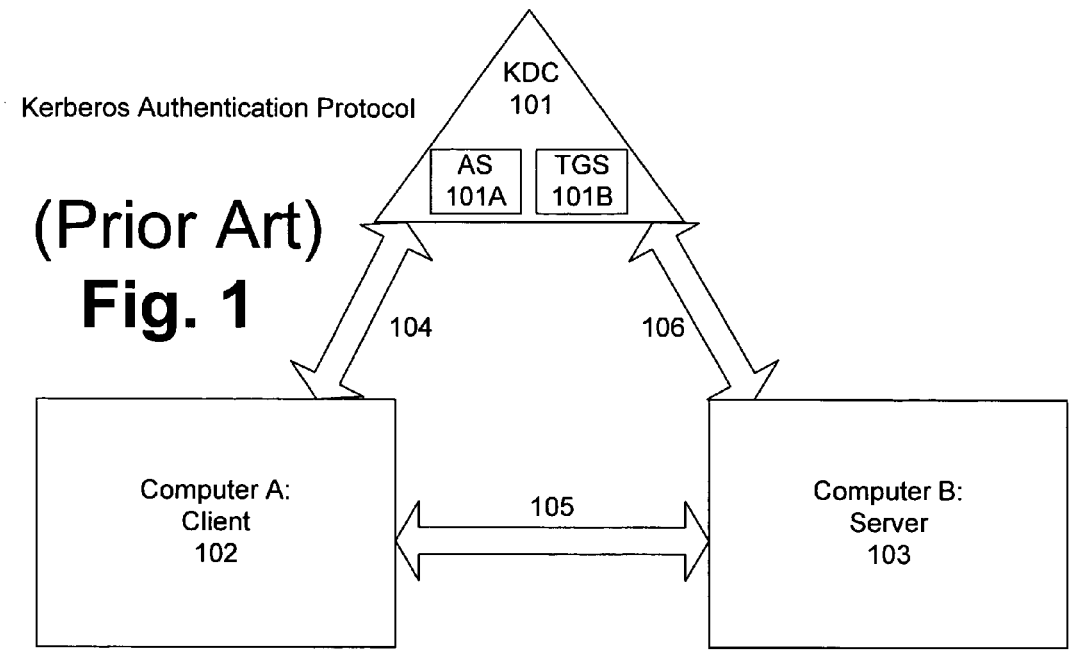
FIG. 1 is a diagram showing three processes involved in the Kerberos authentication protocol.
Figure 2:
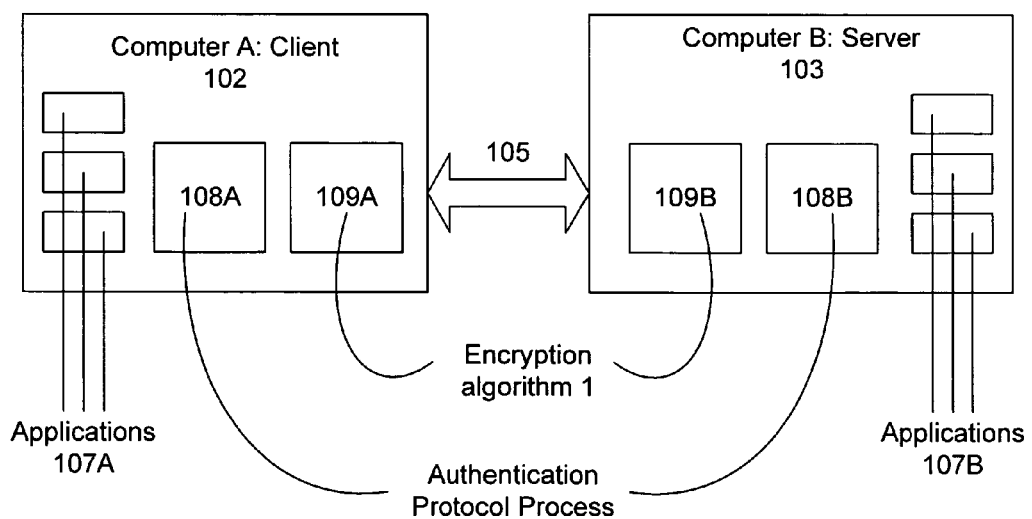
FIG. 2 is a more detailed view of the client computer and server computer involved in an authentication protocol such as Kerberos, showing various authentication processes running on the computers.

Kerberos is an authentication protocol that has experienced wide use. Kerberos was created by the Massachusetts Institute of Technology (MIT) and named for a three-headed dog that guarded the gates of the underworld in Greek mythology. FIGS. 1 and 2, and the following brief discussion, provide a conceptual illustration of Kerberos for use in conjunction with embodiments of the invention. The three headed dog symbolizes the three processes utilized by Kerberos: the client 102, the server 103, and the key distribution center (KDC) 101. The client 102 and the server 103 are sometimes referred to as "principals." The KDC may comprise an authentication server (AS) 101A and a ticket granting server (TGS) 101B.

Under the Kerberos protocol, when a client wants to establish a session with a service, it has to have a session key and a session ticket for the purpose of authenticating itself with that service. The session key and the session ticket are issued by a Kerberos KDC upon request by the client. Since the KDC is itself a service, the client has to first obtain a session key and a session ticket for transactions with the KDC before it can request session keys and tickets for other services. This special session ticket for communicating with the KDC is called a ticket-granting ticket (TGT), and the associated session key is called a "logon session key." When the client wants to access a service other than the KDC, it sends a request, including the TGT, to the KDC for a session ticket for that service. The KDC responds to the request by issuing a session ticket for the target service to the client, which then uses the service session ticket to access the target service.

The Kerberos protocol includes three subprotocols. The subprotocol in which the KDC gives a client a logon session key and a TGT is known as the authentication service (AS) exchange. The subprotocol in which the KDC distributes a service session key and a session ticket for a requested service to the client is known as the ticket-granting service (TGS) exchange. The subprotocol in which the client presents the session ticket for admission to a service is called the application protocol (AP) exchange.

Kerberos currently employs shared private keys (symmetric encryption). The authentication process proceeds as follows, with reference to FIG. 1: A client 102 sends a request 104 to an AS 101A, requesting "credentials" for a given server 103. This request is called an authentication service request ("AS_REQ"). The AS 101A responds 104 with the requested credentials, encrypted in the client's key. The credentials consist of a "ticket" for the server 103, and a temporary encryption key (often called a "session key"). This response is called an authentication service reply ("AS_REP").

The client 102 transmits the ticket (which contains the client's identity and a copy of the session key, all encrypted in a private server key) to the server 103. This transmission is designated in FIG. 1 by the communication arrow 105. This transmission is called the authentication protocol request ("AP_REQ"). The session key (now shared by the client 102 and server 103) is used by the server 103 to authenticate the client 102, by decrypting the client's identity, and may optionally be used to authenticate the server 103. If the client 102 requests authentication of the server 103, thereby providing two-way authentication, the client 102 can encrypt a time stamp using the session key and transmit it to the server 103 along with the ticket. Only the server 103 will be able to decrypt the time stamp, because only the server 103 could decrypt the ticket to obtain the session key. The server 103 can then return the time stamp portion to the client 102, encrypted in the session key, thereby authenticating itself to the client 102. The server reply to the client is called the authentication protocol reply ("AP_REP").

The session key may be used to encrypt further communication between the two parties or to exchange a separate subsession key to be used to encrypt further communication. A subsession key can be any key for use in encrypting and decrypting communications between two or more computers. It is an encryption and/or decryption key that is used subsequently to a first encryption and/or decryption key.

Remaining with FIG. 1, Kerberos implementation consists of one or more authentication servers 101A running on physically secure hosts 101. The authentication servers 101A maintain a database of principals (i.e., clients 102 and servers 103) and their secret keys. Code libraries provide encryption and implement the Kerberos protocol. In order to add authentication to its transactions, a typical network application adds one or two calls to the Kerberos library, which results in the transmission of the necessary messages to achieve authentication. The Kerberos protocol consists of several sub-protocols (or exchanges). There are two methods by which a client 102 can ask a Kerberos server 101 for credentials. In the first approach, the client 102 sends a plaintext request for a ticket for the desired server 103 to the AS 101A. The reply is sent encrypted in the client's secret key. Usually this request is for a ticket-granting ticket (TGT) which can later be used with the ticket-granting server (TGS) 101B, which may also be a part of the KDC 101. In the second method, performed after the client 102 has obtained a TGT, the client 102 sends a request to the TGS 101B. The client sends the TGT to the TGS 101B in the same manner as if it were contacting any other application server which requires Kerberos credentials. The reply is encrypted in the session key from the TGT. Once obtained, credentials may be used to verify the identity of the principals in a transaction, to ensure the integrity of messages exchanged between them, or to preserve privacy of the messages. The application is free to choose whatever protection may be necessary.

To verify the identities of the principals in a transaction, the client 102 transmits the ticket to the server 103. Since the ticket is sent "in the clear" (parts of it may be encrypted, but this encryption does not thwart replay) and might be intercepted and reused by an attacker, additional information is sent to prove that the message was originated by the client 102 to whom the ticket was issued. This information (called the authenticator) is encrypted in the session key, and includes a timestamp, as mentioned above. The timestamp proves that the message was recently generated and is not a replay. Encrypting the authenticator in the session key proves that it was generated by a party possessing the session key. Since no one except the client 102 and the server 103 know the session key (it is never sent over the network in the clear) this guarantees the identity of the client 102.

The integrity of the messages exchanged between principals can also be guaranteed using the session key (passed in the ticket and contained in the credentials). This approach provides detection of both replay attacks and message modification attacks. It is accomplished by generating and transmitting a collision-proof checksum of the client's message, keyed with the session key. Privacy and integrity of the messages exchanged between principals can be secured by encrypting the data to be passed using the session key passed in the ticket, and contained in the credentials.

The authentication exchanges mentioned above are usually in the context of read-only access to the Kerberos database. Sometimes, however, the entries in the database must be modified, such as when adding new principals or changing a principal's key. This is done using a protocol between a client and yet another Kerberos server, the Kerberos Administration Server (KADM) (not shown). There is also a protocol for maintaining multiple copies of the Kerberos database, but this can be considered an implementation detail and may vary to support different database technologies.

Authentication protocols can be used for any authentication. It is easy to imagine a computer user on a client computer authenticating himself to a server computer. A more subtle scenario is depicted in FIG. 2, namely that of one or more applications 107A running on a client computer 102 engaging an authentication protocol 108A to access desired data on a server computer 103. For example, information for a database may be distributed across several computers. A database query initiated by an application 107A on a client computer 102 may require an authentication protocol 108A, 108B to access to the various machines such as server 103. In this situation, the database application, e.g., SQL SERVER or any other database application, would make a function call for the retrieval of the desired information. This function call would be made part of a particular application program interface (API). An API is a language and message format used by an application program to communicate with the operating system or some other control program such as a database management system (DBMS) or communications protocol. APIs are implemented by writing function calls in an application, which provide the linkage to an indicated subroutine for execution.

In example embodiments, the network access control is provided by means based on the Kerberos protocol. Although the following description is directed mostly to embodiments based on the Kerberos protocol, it will be appreciated that the present invention is not limited thereto, and can be readily adapted for use with other authentication protocols.

The following terminology is used herein. A domain controller (DC) is a single machine or computing device. A domain can include many DCs. A domain may also be known as a realm (e.g., in Kerberos). Branch domain controllers are DCs that are deployed in a branch office site and their physical security is not as strong as the DCs in the corporate office. As such, a compromise for a branch DC is deemed more likely. A hub DC is a DC that is set up to act as a window for the branch to communicate with the rest of the directory (e.g., Microsoft Active Directory®) (AD) infrastructure. A PDC is the primary domain controller (e.g., as established in Windows 2000 onwards.) Main DCs include the hub DCs, the PDC and, for example, other Windows 2003 and Windows 2000 DCs. Krbtgt is the account that represents the Kerberos AS service. This account has a key called the krbtgt key (or KDC key) that is used to encrypt the TGTs.

A KDC is a service that runs on the DC. A directory service, such as Active Directory®, stores information about network-based entities, such as applications, files, printers, and people. A directory service also manages identities and brokers resources between distributed resources, e.g., manages secret information. Kerberos KDC uses this secret information. The KDC authenticates the users because it has access to the users' secrets through the directory.

Figure 3:
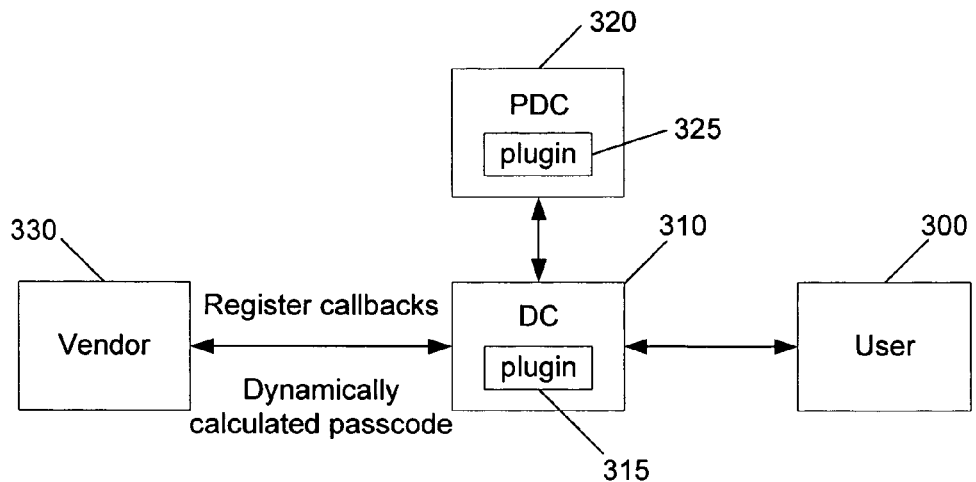
FIG. 3 is a block diagram of an example one time password (OTP) with plugin system.

FIG. 3 is a block diagram of an example one time password (OTP) with plugin system. A one time password is similar to an ordinary password that changes frequently. The user 300 is permitted to type in the one time passcode into a logon user interface just like a password. It is desirable to limit the changes required to the core infrastructure in order to have a stable solution. Rather than calling the SAM APIs to get the static passwords, vendors 330 may register callbacks on the DC 310 to plugin 315 their algorithm. These callback functions will return the dynamically calculated passcode (or set of possible passcodes) for the user at a specific point in time. This passcode will then be treated as a typical password by the DC.

The vendor code to be hosted on the DC should be minimal because it calculates the passcode and returns it. Attributes such as PIN and serial # of token may be stored and managed in AD (e.g., through a vendor-specific user interface). By having just this minimal code running in system context on the DC 310, the stability of the system may be assured.

Each DC 310 desirably has a vendor plugin 315 for optimum performance. Moreover, the PDC 320 desirably has the vendor plugin 325. Other DCs will forward requests to the PDC (just like when there is a bad password error) if there is no vendor plugin on the local box.

Thus, part of the key material is stored statically and part of it is computed dynamically to initiate the Kerberos (or other type) logon.

Figure 4:
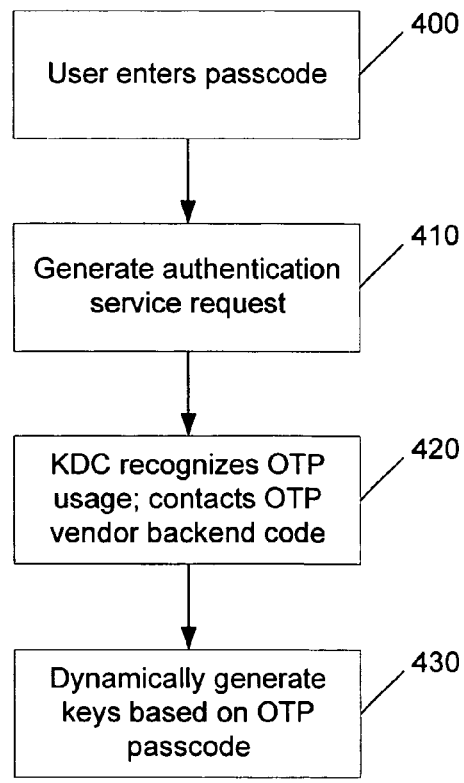
FIG. 4 is a flow diagram of an example OTP method.

FIG. 4 is a flow diagram of an example OTP method. For Kerberos interactive logon, for example, the passcode entered by the user, at step 400, is treated by the client as a normal password which then generates the AS-REQ, at step 410, after computing the key with the string-to-key function. On the KDC side, at step 420, instead of resorting to the SAM, the KDC will recognize the OTP nature of the credentials (e.g., through a flag provided in the Active Directory, or as indicated by the preauth in the AS-REQ) and will directly contact the OTP vendor backend interface code which will provide the dynamically generated Kerberos keys based on the OTP passcode, at step 430.

Because the passcode may be dependant on time/counter, time/counter skews should be accounted for, and hence the backend interface is desirably rich enough to provide a collection of values that the KDC can try. The exact number of values will depend on the range of values currently used in deployment and the performance implications of key re-tries. Once the preauth is verified, the KDC will use the successful key for encrypting the AS-REP. Subsequent network authentications take place as usual once the TGT is extracted by the client.

With the existing preauth, the passcode and PIN are vulnerable to a preauth attack. While increasing the iteration count will make the computation difficult for an attacker, it will also make the computation more difficult for the server. Also, once the attacker cracks the key, he can decrypt the TGT session, which may be valid for a predetermined amount of time, such as eight hours.

Alternatively, a preauth can be used that takes advantage of the properties of OTP and Diffie Hellman (DH). Normally, signing Diffie Hellman parameters with a password would be vulnerable to a dictionary attack to the same degree as the normal preauth. But signing the Diffie Hellman parameters with the OTP passcode would make a brute force attack dictionary attack very difficult because the attack will have to succeed in the very short time that the OTP code is valid. Moreover, after the OTP code is used once it cannot be reused again, and so the attacker will have to perform an active attack which is much more difficult. If the attacker cracks it after the OTP code is no longer valid, he will not be able to use it to decrypt the TGT session key because it is encrypted with the DH key which is not known to the attacker. The Diffie Hellman parameters may be signed using the OTP passcode by providing a message intergrety code (MIC), for example.

Figure 5:
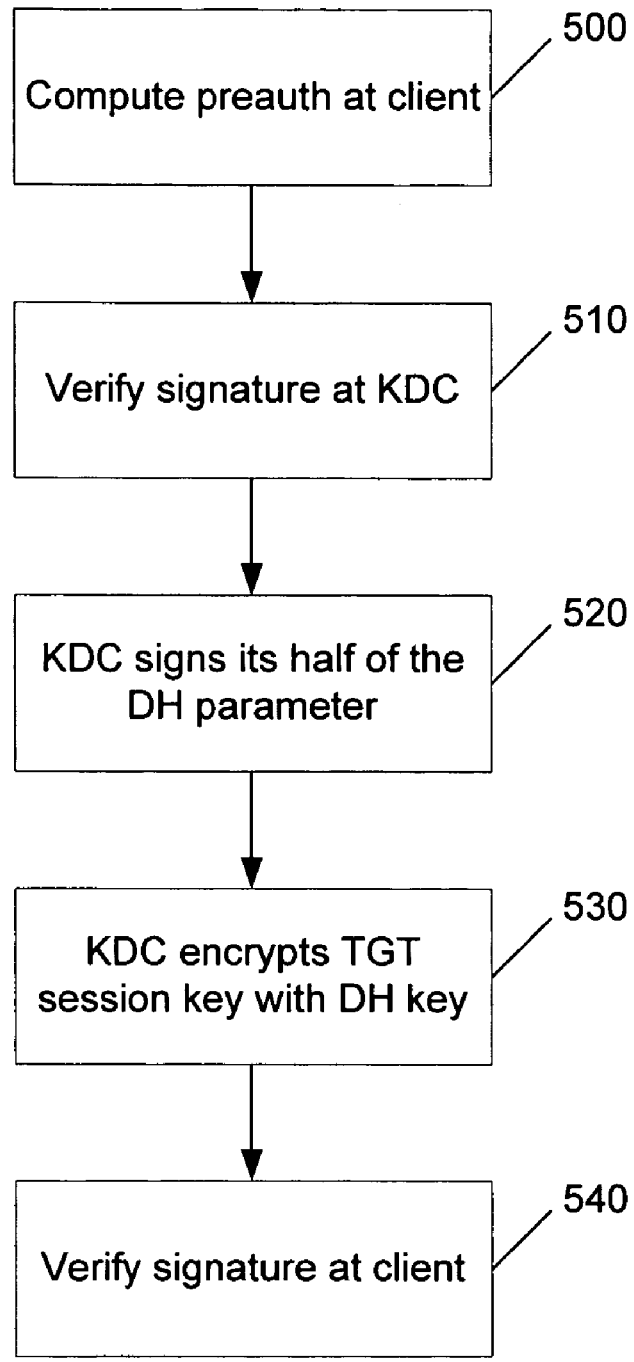
FIG. 5 is a flow diagram of another example OTP method.

FIG. 5 is a flow diagram of another example OTP method. The preauth may desirably be computed by the client as Sign($g^x$+TimeStamp, Passcode), at step 500. The KDC verifies the signature, at step 510, to assure itself that the DH parameter was sent by a valid client. Then, at step 520, the KDC sends its half of the DH parameter ($g^y$) signed in the same way. The KDC encrypts the TGT session key with the DH key ($g^{xy}$), at step 530. At 540, the client verifies the signature of the KDC.

Regarding next token prompting, if the token is out of the initial time/counter window (say 5 minutes) but within a somewhat larger extended window (say 20 minutes), then the user might be re-prompted by asking for the subsequent token code. This provides assurance that the value was not a lucky guess from an attacker but instead a legitimate case of a longer timeskew. In this case, the KDC will desirably return an extended error (or new error code) back to the client. The credential provider will need to handle this new error code and prompt the user to reenter the subsequent token code. In this case, state will desirably be kept by the OTP plug-in and the KDC will not maintain any state but will treat the subsequent authentication as a new one.

Regarding the logon user experience, the user may enter a username and the passcode. If the user sees a single password dialog, then the user will enter the passcode in a concatenated manner. Additionally, the user may enter the PIN and the token code in the separate fields as requested by the UI. This UI experience is determined by the credential provider of the vendor. Ultimately, the vendor's credential provider will provide a string on the client to do the encryption and a set of possible string/key values on the KDC to do the decryption.

Some example scenarios are provided where one time passwords may be used. For remote email access, suppose a user often travels on work and uses her corporate laptop to access email. She also uses her laptop at home to access email. To make this easier, the IT department has rolled out RPC/HTTP with an email application so that the user can seamlessly access her email across the Internet. The email experience is the same as when on the corporate network. When the email application starts, it prompts the user for her credentials and she enters her passcode in the credentials box. The experience of entering credentials may be customized by the vendors through the use of different credential providers, or a default operating system password credential provider may be used and the user asked to type the passcode into the password box. The administrators can enable access restrictions based on whether the user authenticated with OTP or not.

For remote web application access, suppose a user is in a place where she does not have her laptop she can use any Internet terminal to access her corporate applications through web portals. Single sign on to these web portals is provided by means of ADFS. Her experience of entering the passcode is similar to that described above. The administrator does not have to go through the pains of setting up a separate OTP server for ADFS that will do the OTP as is the case today. ADFS will desirably provide a configuration option for the admin to enable OTP.

For interactive windows logon, suppose the user is a middle manager at a corporation. The IT administrators at the corporation have issued OTP tokens to their users because they do not believe they will use strong passwords. The user walks into her office in the morning and uses her OTP passcode to logon. For the username field, she uses her regular alias. The user does not need to be taught to recognize a new UI. Even when the user needs to do a command line based logon, she still follows the same principle to enter her credentials. The UI may be customized by the vendors using their own credential provider. The administrator issues a token to the user and instructs her to type in the passcode of her password. The administrator initializes the user's account with the code on the back of the token and sets her account to be marked as OTP only in Active Directory (i.e., the user can only be authenticated using OTP).

For a network logon, suppose the user after logging on to the workstation using one time passwords accesses her corporate web page to check whether her revised financial contributions have taken effect. The site uses integrated authentication and the user does not have to enter her password again at all. The user also accesses her work related server that has RSA ClearTrust installed on it. Again the user is able to access the server seamlessly without any problems. The servers can be in the same domain another trusting domain or another trusting forest. The access is no different than if the user were to have logged on with a password.

Example Computing Environment

Figure 6:
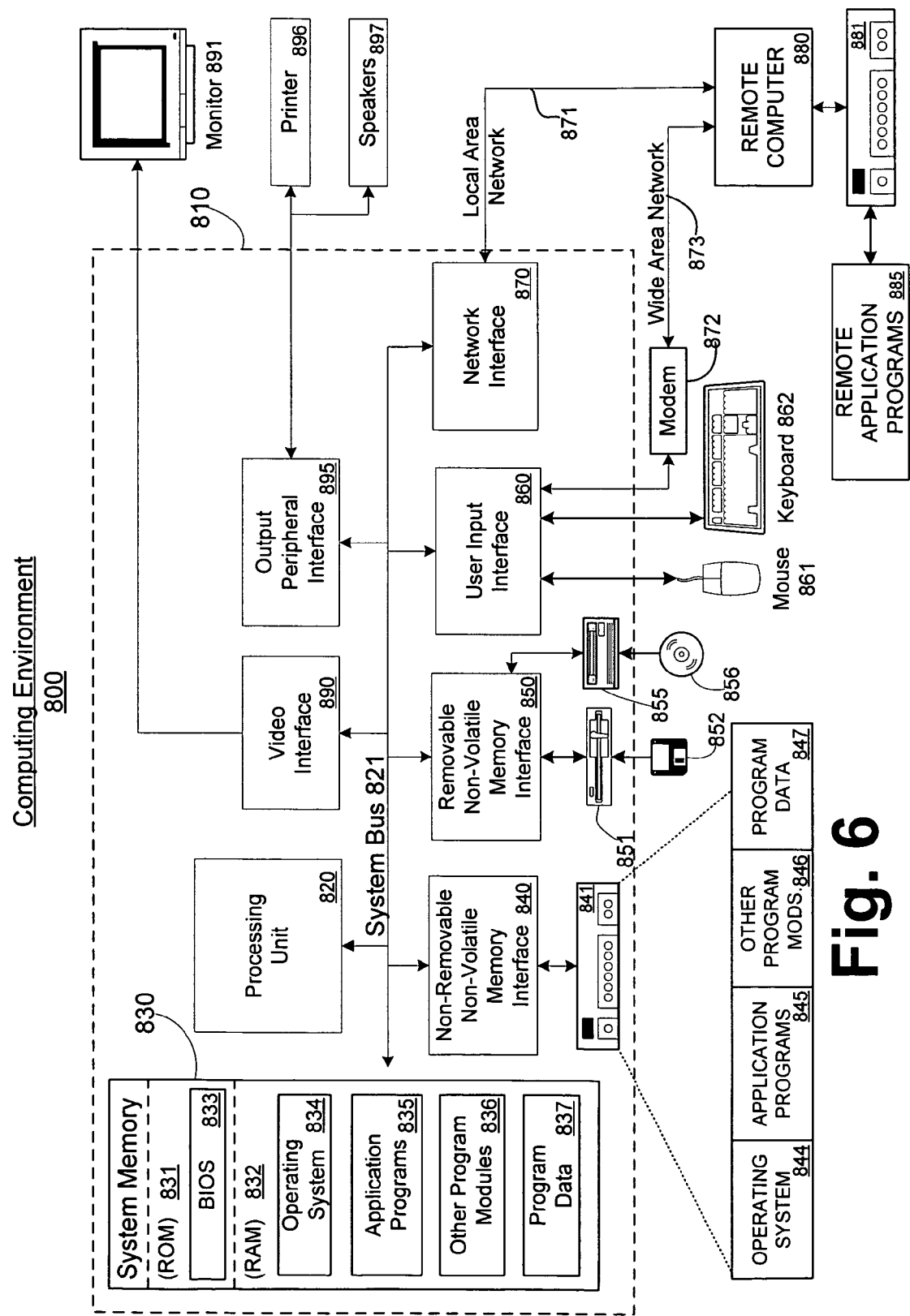
FIG. 6 is a block diagram showing an example computing environment in which aspects of the invention may be implemented.

FIG. 6 and the following discussion are intended to provide a brief general description of a suitable computing environment in which an example embodiment of the invention may be implemented. It should be understood, however, that handheld, portable, and other computing devices of all kinds are contemplated for use in connection with the present invention. While a general purpose computer is described below, this is but one example. The present invention also may be operable on a thin client having network server interoperability and interaction. Thus, an example embodiment of the invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer or tester, and/or included within the network browsing software which will be described in the general context of computer-executable instructions, such as program modules, being executed by one or more computers (e.g., client workstations, servers, or other devices). Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. An embodiment of the invention may also be practiced in distributed computing environments where tasks are performed by remote processing devices that are linked through a communications network or other data transmission medium. In a distributed computing environment, program modules may be located in both local and remote computer storage media including memory storage devices.

FIG. 6 thus illustrates an example of a suitable computing system environment 800 in which the invention may be implemented, although as made clear above, the computing system environment 800 is only one example of a suitable computing environment and is not intended to suggest any limitation as to the scope of use or functionality of the invention. Neither should the computing environment 800 be interpreted as having any dependency or requirement relating to any one or combination of components illustrated in the exemplary operating environment 800.

With reference to FIG. 6, an example system for implementing the invention includes a general purpose computing device in the form of a computer 810. Components of computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 810 typically includes a variety of computer readable media. Computer readable media can be any available media that can be accessed by computer 810 and includes both volatile and nonvolatile, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, random access memory (RAM), read-only memory (ROM), Electrically-Erasable Programmable Read-Only Memory (EEPROM), flash memory or other memory technology, compact disc read-only memory (CDROM), digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above should also be included within the scope of computer readable media.

The system memory 830 includes computer storage media in the form of volatile and/or nonvolatile memory such as ROM 831 and RAM 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 6 illustrates operating system 834, application programs 835, other program modules 836, and program data 837. RAM 832 may contain other data and/or program modules.

The computer 810 may also include other removable/non-removable, volatile/nonvolatile computer storage media. By way of example only, FIG. 6 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856, such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 6 provide storage of computer readable instructions, data structures, program modules and other data for the computer 810. In FIG. 6, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies. A user may enter commands and information into the computer 810 through input devices such as a keyboard 862 and pointing device 861, commonly referred to as a mouse, trackball or touch pad. Other input devices (not shown) may include a microphone, joystick, game pad, satellite dish, scanner, or the like. These and other input devices are often connected to the processing unit 820 through a user input interface 860 that is coupled to the system bus 821, but may be connected by other interface and bus structures, such as a parallel port, game port or a universal serial bus (USB).

A monitor 891 or other type of display device is also connected to the system bus 821 via an interface, such as a video interface 890. In addition to monitor 891, computers may also include other peripheral output devices such as speakers 897 and printer 896, which may be connected through an output peripheral interface 895.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated in FIG. 6. The logical connections depicted in FIG. 6 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 6 illustrates remote application programs 885 as residing on memory device 881. It will be appreciated that the network connections shown are exemplary and other means of establishing a communications link between the computers may be used.

One of ordinary skill in the art can appreciate that a computer 810 or other client devices can be deployed as part of a computer network. In this regard, the present invention pertains to any computer system having any number of memory or storage units, and any number of applications and processes occurring across any number of storage units or volumes. An embodiment of the present invention may apply to an environment with server computers and client computers deployed in a network environment, having remote or local storage. The present invention may also apply to a standalone computing device, having programming language functionality, interpretation and execution capabilities.

The various systems, methods, and techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the functionality of the present invention.

While the present invention has been described in connection with the preferred embodiments of the various figures, it is to be understood that other similar embodiments may be used or modifications and additions may be made to the described embodiments for performing the same functions of the present invention without deviating therefrom. Therefore, the present invention should not be limited to any single embodiment, but rather construed in breadth and scope in accordance with the appended claims.

What is claimed:

1. A one time password system, comprising:
   a computer processor comprising a plugin that supports software interface code to generate a one time passcode, the interface code dynamically generating secure Kerberos keys based upon the one time passcode, the plugin recognizing the one time passcode, receiving the secure Kerberos keys, and initiating a Kerberos logon session based upon the received secure Kerberos keys, wherein the computer processor comprises callback functions registered thereon that generates a dynamically calculated passcode for a user to support the plugin; and
   a logon user interface initiated upon the computer for receiving the secure Kerberos keys dynamically generated by the interface code based upon the one time passcode, signing a message with the received secure Kerberos keys, and outputting the signed message.

2. The system of claim 1, wherein the computer processor hosts code that calculates the one time passcode.

3. The system of claim 1, further comprising a primary domain controller having another plugin.

4. The system of claim 1, wherein part of a key is stored on the computer processor and part of the key is computed dynamically by the computer processor.

5. A computer-implemented method for using a one time password, comprising:
   a domain controller in a computer initializing a plugin that supports software interface code to generate a one time passcode;
   the computer recognizing the one time passcode within the plugin and subsequently receiving secure Kerberos keys that are dynamically generated by the interface code based upon the one time passcode, wherein the domain controller registers callback functions that generates a dynamically calculated passcode for a user to support the plugin; and
   the computer receiving the secure Kerberos keys dynamically generated by the interface code and based upon the one time passcode at a logon user interface, initiating a Kerberos logon based upon the received secure Kerberos keys, signing a message with the received secure Kerberos keys, and outputting the signed message.

6. The method of claim 5, further comprising the domain controller hosting code that calculates the one time passcode.

7. The method of claim 5, further comprising storing part of a key on the domain controller and the domain controller dynamically computing part of the key.

8. A computer-readable storage medium comprising computer-executable instructions that, when executed by a processor, implement a method for using a one time password, said method comprising:
   instructions for initializing a plugin within a domain controller of a computer that supports software interface code to generate a one time passcode;
   instructions for recognizing the one time passcode within the plugin and subsequently receiving secure Kerberos keys that are dynamically generated by the interface code based upon the one time passcode, wherein the domain controller comprises callback functions registered thereon that generates a dynamically calculated passcode for a user to support the plugin; and
   instructions for receiving the secure Kerberos keys dynamically generated by the interface code and based upon the one time passcode at a logon user interface, initiating a Kerberos logon based upon the received secure Kerberos keys, signing a message with the received secure Kerberos keys, and outputting the signed message.

9. The computer-readable storage medium of claim 8, wherein the domain controller hosts code that calculates the one time passcode.

10. The computer-readable storage medium of claim 8, further comprising a primary domain controller having another plugin.

11. The computer-readable storage medium of claim 8, wherein part of a key is stored on the domain controller and part of the key is computed dynamically by the domain controller.

* * * * *